June 18, 1968  S. LEITNER  3,388,630
METHOD AND APPARATUS FOR INVESTIGATING A VIEWER'S INTEREST
Filed April 7, 1964  2 Sheets-Sheet 1

INVENTOR:
SEBASTIAN LEITNER,
BY  *Ernst B. Marmorek*
HIS ATTORNEY.

United States Patent Office 3,388,630
Patented June 18, 1968

3,388,630
METHOD AND APPARATUS FOR INVESTIGATING A VIEWER'S INTEREST
Sebastian Leitner, 2 Muthgasse XIX, Vienna, Austria
Filed Apr. 7, 1964, Ser. No. 358,043
Claims priority, application Austria, Apr. 10, 1963,
A 2,924/63; Aug. 27, 1963, A 6,884/63
17 claims. (Cl. 88—24)

ABSTRACT OF THE DISCLOSURE

Apparatus and method for investigating and recording a viewer's interest in details of an object. The apparatus provides for parts manipulatable relative to each other to bring selected details into the viewer's field of vision, and records the relative movements of the parts. The method provides for recording of approximately the periods of time spent by the viewer on each selected view.

---

This invention relates to a method and an apparatus for investigating the interest of the reader of a printed publication, a pamphlet or the like, or of the viewer of a stationary three-dimensional view or presentation, such as a shop window, or of a pictorial or graphic presentation, in the various items of this publication or presentation. The last-mentioned terms are to be understood in their broadest sense. Instead of a three-dimensional object, a picture of this object may be submitted to a testee.

The previously known method for investigating the interest of preference of readers or viewers have been restricted to opinion research, in which an interrogator submits various questions to be answered to individual testees, who may be selected at random or systematically from the population addressed by the printed publication or presentation.

Such questioning, however, requires the services of experts and takes considerable time, and the result is inherently unreliable, for various reasons.

In the first place, the result will depend on the formulation of the questions which may be more or less appropriate and ought to be adapted to the education level of the testee; in view of the wide range which is desired, however, this requirement cannot be met. It cannot be taken for granted that the testee is prepared to answer questions submitted to him and even if he is prepared to do so, his reaction will depend on psychological factors which can be recognized only with difficulty and are highly influential.

In the second place, it is fairly significant whether or not the person questioned has a sympathy for the questioner. This factor may also be effective if the questioner is free to select the testees.

Thirdly, the person questioned may not give his opinion without being influenced either consciously or unconsciously in accordance with his external surroundings and internal mental and moral constitution. Who, for instance, would care to admit freely that he is more strongly attracted by the comic strips in a newspaper than by an important event of international politics; or that he takes basically a greater interest in motion pictures than in the legitimate theater? For this reason, such questions will not be answered frankly but only with reservations in most cases and the evaluation of these reservations will depend on the questioner and bear his impression.

Apparatus adapted to give a representation of the interest or sympathy have not yet been disclosed at all.

It is among the principal objects of the invention to provide methods of and means for investigating and recording a viewer's interest free from bias by the above-mentioned influences.

It is another object of the invention to expose images of portions of an entire object to a viewer in accordance with selections made by the viewer, and to record at least approximately the time spent by the viewer in viewing each of the selected successive images.

It is a further object of the invention to provide methods of and means for adjusting the size of the aforesaid images in accordance with selections by the viewer and to record the selected magnifications.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

In accordance with one embodiment of the invention, the testee is presented at least temporarily with a general view indicating the nature of all items presented, for instance the titles of the articles on a page of a newspaper, or a picture, or all articles displayed in a glass case. To ascertain the interest of the testee and to enable a statistical analysis of this interest, the testee is given a distinct visual image of one of these items at a time in addition to the general view. The selection of these images and the sequence in which they are viewed is made to be at the discretion of the testee and the selected sequence and at least approximately the period of time devoted to the viewing of each image are recorded.

Each of the individual images is only a section of the general view but in a form which permits also the showing of details. The definition of the various images is effected by an image-forming bundle of rays which enables the viewing of the images. This bundle of rays is composed of rays that are emitted by a planar or three-dimensional item and are combined in the eye of the viewer to form an image. These rays may have previously passed through an optical system which defines the direction of view, or the viewable part, or produces an intermediate image, or has a magnifying effect, and the like. Whenever the viewer desires a change to another image, the position of the image-forming bundle of rays relative to the overall object must be changed. If the object must be changed. If the object is stationary, the bundle of rays must be displaced and/or pivotally moved or, if the bundle of rays is stationary, the object must be moved. Such a change in the relative position may also be effected by simultaneous changes in the position or direction both of the object and of the bundle of rays. To record the sequence in which the individual items of the overall object to be judged are viewed by the testee, the chronological succession of the changes made by the testee in the relative position for changing the image may be recorded.

The image-forming bundle of rays may be related firmly three-dimensionally to a bundle of light rays producing a light spot on a light-sensitive layer, for instance, an image of a luminous object, such as a light source or an illuminated aperture. When the light sensitive layer is developed after the test, it will show a trace or curve drawn by the moving light spot. The radiation used for this purpose need not belong to the range of the visible spectrum but may be invisible, provided that it modifies the light-sensitive material. This gives an exact record of the sequence in which the viewer has directed his attention to the various items of the overall object, which are associated each with a certain area or path. The blackening of these areas will permit of a conclusion as to the residence time of the light spot and consequently to the intensity of the interest.

In many cases it will be possible to provide a printed publication to be tested, such as a newspaper, a typed or duplicated leaflet or the like, with a suitable light-sensitive layer, for instance by impregnating it with a light-sensitive substance or by connecting it to such a layer. If the newsprint is sufficiently permeable to light, it may be placed on a light-sensitive paper. To make it sufficiently permeable, the newspaper sheet may be treated with a suitable liquid. If a light spot, produced on the test object by actinic radiation, is moved together with the viewing device during the viewing of the test object, the radiation will modify the light-sensitive layer and the trace of the light spot will become apparent after the development. The light spot may illuminate the entire field of view. In that case the developed layer will not show a linear trace but an area which has differently blackened sections, and the darker parts of which have more highly attracted the attention of the testee than the others.

In accordance with another embodiment of the invention, the testee, who is presented at least temporarily with a general view indicating the nature of all items presented, for instance the titles of the articles on a page of a newspaper and is given a distinct visual image of one of these items at a time in addition to the general view, and selects these images and the sequence in which they are viewed, the selected sequence and, at least approximately, the period of time devoted to the viewing of each image are recorded; likewise, the chronological succession of the changes made by the testee in the relative position for changing the image is recorded in order to record the sequence in which the individual items of the overall object to be judged are viewed by the testee.

When it is desired to investigate objects which cannot be arranged entirely one beside the other in a single presentation, such as newspapers or printed publications having a plurality of pages, a series of pictures or the like, this will result in a successive investigation of parts of such object, such as the individual pages of the newspaper. In these cases, the general view initially given to the testee is restricted to that part of the object which consists of the sections or individual items which are to be tested immediately thereafter.

Such a method can be carried out in a simple manner which gives an information on the interest to be investigated. Accordingly, images of parts or sections of the object to be considered are produced on a fixed image-bearing plane and the testee is enabled to adjust the size of these images within predetermined limits, the object or a record carrier positively corresponding to said object is simultaneously marked in portions corresponding to those parts or sections of the object which are viewed at a time, and the magnification adjusted by the testee is recorded.

The invention will be described in detail hereinafter with reference to embodiments of apparatus falling within the scope of the invention and devised for investigating the interest and diagrammatically shown in the drawings, wherein FIG. 1 is a fragmentary sectional view of an apparatus intended for testing a text or a pictorial presentation, in accordance with an embodiment of the invention;

FIG. 3 is a schematic plan view of an apparatus intended for viewing a shop window or the like;

Figure 1:
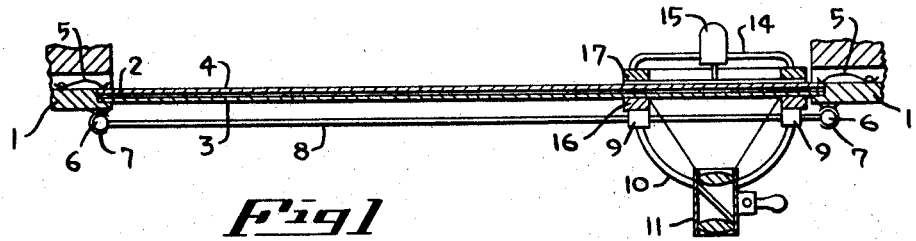

The apparatus shown in FIG. 1 comprises an object frame 1, which defines an aperture, for instance, of rectangular form. The end faces of the frame facing the opening have a shoulder 2 for supporting two plates 3, 4, which are held in position, for instance, by pivotally movable springs 5. A guide, for instance a resilient sleeve 7, is arranged in front of each of the two side members of the frame. A bar 6 is slidable along each of the sleeves 7. The two bars 6 are connected by two parallel cross-bars 8, on which a viewer frame 10 is longitudinally slidably guided by means of sliding sleeves 9. The viewer frame 10 carries an optical viewing device 11 of known type, which for this reason is not shown in detail. The device 11 comprises an optical system which is slidably mounted in a sleeve held by the viewer frame 10 to enable the focusing of the system and is connected to a laterally attached light source like an opaque illuminator. The aperture angle of the bundle of rays emitted by the light source is selected to illuminate the field of view which is defined by the image-forming optical system and presented to the testee.

The plate 3 which is nearer to the viewing device consists of transparent material, such as glass or polymethacrylate resin. It may be firmly connected to the frame 1. The other plate 4 consisting of transparent or opaque material is in any case removable. When the printed publication to be tested has been provided with a light-sensitive layer and placed between the two plates 3 and 4, the testee can slidably move the two bars 6 and the cross-bar 8 connected to them and can slidably move the viewer frame 10 along the cross-bars 8 so that he can move the viewing device 11 into a position over any item or part of the printed publication constituting the overall object to be evaluated. The illuminating bundles of rays falling on the various parts exert on the light-sensitive layer an influence which depends on the time spent for reading the respective part. The differentially blackened layer, which is obtained by developing after the test, permits of a conclusion as to this time and hence the interest shown.

Figure 2:
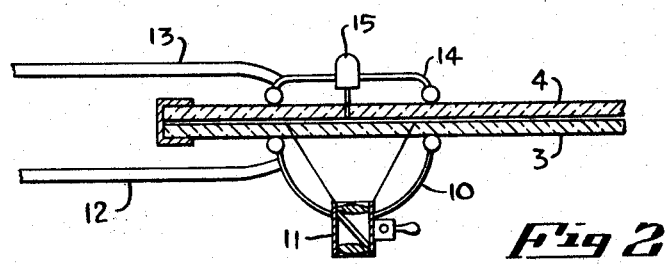
FIG. 2 is a large scale fragmentary sectional view showing another embodiment of such an apparatus.

A similar apparatus is shown in the modified embodiment of FIG. 2. This apparatus comprises also a viewing device 11 and an attached illuminating device which is mounted on a viewer frame 10. Two transparent plates 3, 4, for instance made of glass, which lie one on the other, are mounted opposite to the viewing device at a fixed distance therefrom. The viewer frame 10 is attached to the end of the parallel bars 12 of one arm of a parallel motion device of suitable conventional construction, for instance of the type used in drafting machines. Each of the two bars 12 of this arm is forked and its rear tine 13 is disposed behind the plates 3, 4. A frame 14 is connected to the ends of the extension and carries a light source 15 for producing a narrow light beam. Before a test, the two plates 3, 4 are taken apart and the planar test object is laid on the front plate 3 with the printed face confronting the viewing device. A light-sensitive paper is laid on the test object with its layer facing the light source 15. Then the plate 4 is applied. The arrangement of the light source is such that the center of the light spot formed on the light-sensitive layer coincides substantially with the center of the field of view to which the viewing device is adjusted and which is illuminated by its illuminating device. It is not necessary for the axes of the light beam and the viewing devices to coincide.

When the light-sensitive paper is developed after the test, the trace described by the light spot will become apparent in the form of a dark strip having differentially blackened areas. A light source 15 for producing a light spot may also be connected to an arrangement as shown in FIG. 1, as is indicated there. The viewer frame 10 may be connected to an annular permanent magnet 16, which extends almost as far as to the front plate 3 and is moved in unison with the viewing device. The frame 14 for mounting the light source 15 will then carry a ring 17 of soft iron or a ring magnet of a shape conforming to the permanent magnet. The latter co-acts with the ring or ring magnet to hold it against the transparent plate 4 and causes the ring or ring magnet to follow a displacement. Magnetic couplings of this kind have already proved satisfactory in connection with shop windows. The only requirement to be met in this connection resides in that the light source 15 must not have an excessive weight. There is no difficulty, however, to provide light sources which are small and light in weight.

It will be appreciated that it is not essential to provide an arrangement in which the viewing devices and the illuminating light source are movable and the object frame is fixed. The object frame may be movable and the optical means may be stationary. The viewing devices may consist of fairly simple optical systems, such as reading glasses or the like. The object frame may be vertically or horizontally oriented or assume an inclined position, which may be variable, if desired.

Figure 3:
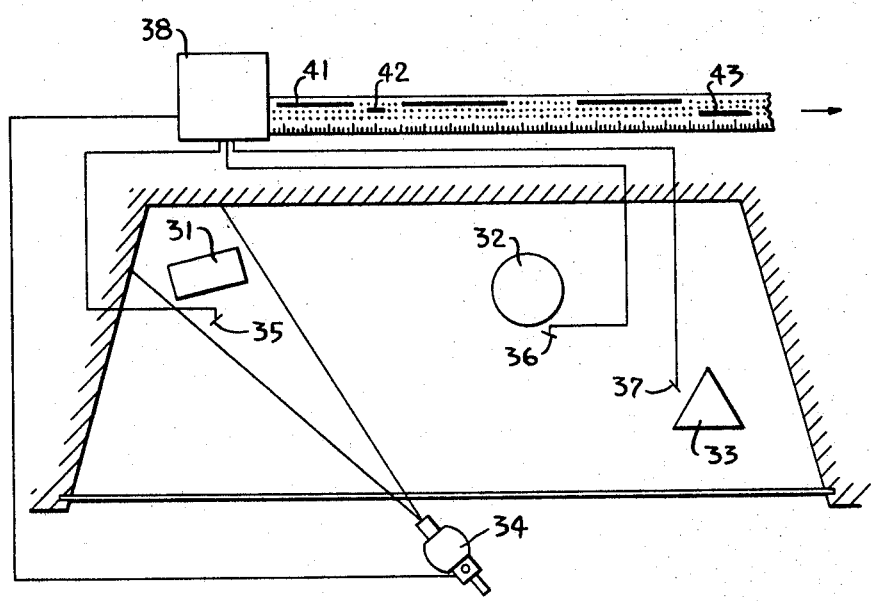

An apparatus for evaluating a three-dimentional overall object is illustrated in FIG. 3. Three articles 31, 32 and 33 are on display in a confined room behind a shop window. An optical viewing device 34 is mounted at a fixed distance from the window pane in such a manner that the optical axis of this device can be adjusted to any direction required for sighting the three articles.

To this end, the device 34 may be mounted for pivotal movement about two mutually perpendicular axes. An illuminating device is coupled to this optical device to move in unison with it and produces a cone of light that has an aperture angle sufficient for illuminating each of the three articles. The illuminating device may be mounted above, below or laterally of the viewing device 34 or may be structurally combined with it. The latter arrangement is shown for the sake of simplicity. A small photo-electric cell 35, 36, 37 is disposed near each article, and the light-sensitive layer of these cells faces the illuminating device. Each of these cells is connected by a lead to a switching and recording device 38 which may, for instance, contain a drum (not shown) that can be driven to rotate at a uniform speed and on which recording paper 39 is wound which is preferably provided with a time scale. A stylus and a track 41 or 42 or 43 on this paper 39 are associated with each photoelectric cell. The display is permanently illuminated or is illuminated until the beginning of the testing period. This illumination is sufficent to enable the testee to become aware of the nature of each article without permitting him to recognize details. If the testee, for instance, directs the viewing device 34 onto the article 31, which has primarily aroused his interest, the energization of the illuminating device will also start the drum, and the photo-electric cell 35 excited by the incident light of the light cone will cause the stylus to engage the associated track 41. The stylus will now draw a line. The length of this line will be proportional to the period of time devoted to the viewing of the article 31. If the testee then directs the viewing device to the article 32, the associated photo-electric cell 36 will be excited and the associated stylus will draw a line along the track 42. If the article 31 is then viewed once more after an interval of indecision, this will be indicated by two marks along the track 41, which are separated by a free space. A subsequent mark on the track 43 indicates that and for how long the viewer has directed his attention to the article 33. Hence, the record on the chart 39 will give exact information as to the sequence in which the testee has viewed the individual articles on display and the time he has devoted to each article. For the sake of clarity, it has been assumed here that the number of articles is very small. This information enables a statistical analysis of the interest aroused by the nature and arrangement of the articles.

It may be mentioned that the proposed method and the apparatus described are not only suitable for testing overall objects by having them viewed by a number of persons selected at random, but persons may also be tested by submitting to them a text or a presentation chosen according to known considerations.

Figure 4:
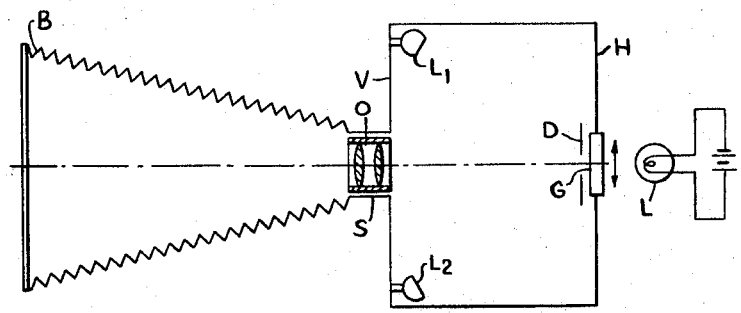
FIG. 4 is a schematic plan view of an apparatus embodying a modification.

The apparatus shown in FIG. 4 comprises a stationary image-bearing surface B, which may be planar or slightly cambered and may consist of a ground screen held in a frame and made of glass or other translucent material which permits of a viewing of optical images produced on the rear side. A lens O is mounted in a tube in front of this image-bearing surface. The tube is light tightly connected to the front wall V of a chamber, the rear wall H of which constitutes a support for the object G to be tested. In this apparatus the axis of the lens is fixed so that the object must be displaceable for the relative displacement required between the object and the lens for the formation of an image of various parts of the object. For this reason, the support provided for the object must permit of a displacement of a suitable magnitude in two directions, which are preferably mutually perpendicular, if each point of the object should be movable into the optical axis of the lens. A stationary light source L is disposed behind the object and emits a bundle of light, the axis of which intersects the rear wall or, more properly, the rear of the object, at or at least near the point of intersection of the optical axis. The axis of this bundle of light is preferably substantially parallel to the axis of the lens.

According to one feature of the invention, the testee is given at the beginning of the test a general view of the entire object. Hence, the nature of the lens O and the size of the useful image-bearing area must be such that an image of the entire object can be produced and received.

The masking of parts of the object for the required production of images of only parts or sections of the object, however, is effected by means of a field-defining stop which is closely spaced from the object in front of the same and can be selectively inserted and removed. Such a stop may be alternatively disposed in the lens, for instance, at the position of a real intermediate image.

The objects which may be investigated include printed, written or typed texts, or texts reproduced by other means, or pictorial presentations, such as pictures, announcements or the like, with or without accompanying text. In order to minimize the size of the apparatus, it will be recommendable in many cases to use no originals for the test, but to make small-scale pictures from the originals in such a size that the pictures can be accommodated in a box which may then have a relatively small size in spite of the need for displacing the object. The object to be shown must be illuminated. For this purpose the box contains an illuminating device which is indicated by two lamps $L_1$ and $L_2$. In most cases it will be recommendable to illuminate the object with diffused light.

A displacement of the object may not only result in a change of the section viewed at a time but also in a change of the object itself. In the case of a relatively large object, such a printed publication having a plurality of pages, small-scale copies of these pages may be made one below the other on a strip-like carrier and this roll may be placed into a feeding mechanism of the type provided in a roll film camera for feeding the film. Such a device, which may be designed to meet certain requirements regarding frame size, feeding stroke, etc., may be mounted on the outside of the wall surface of the chamber. In certain cases it may be sufficient to provide for a displaceability of the feeding device in a direction which is at right angles to the direction of the continuous or intermittent feeding to be effected with this device and nevertheless to enable a movement of each selected section of an object to such a position that the image of this section is produced in the central area of the image-bearing surface.

In most cases, the general view first presented to the testee will not show the text or pictorial presentation in its original size but will show it in a distinct manner one a smaller scale.

The required focal length of the lens will then depend on the size of the object, the desired size of the apparatus and the selected scale of the image. It is left at the discretion of the designer which dimensions he will substantially determine beforehand in view of the special requirements of a given application and which other dimensions he will adapt to these predetermined dimensions. The use of objects G consisting of reproductions of the original object on a highly reduced scale in the apparatus permits of a use of lenses having a short focal length and of a reduction of the overall size. For this reason it will always be recommendable to bear this possibility in mind.

According to one feature of the invention, the selection of the image scale is to be at the discretion of the testee. For this purpose, the image-producing means must permit of a change in magnification at the discretion of the viewer. This requirement may be met by the use of a lens having a focal length which is variable within a certain range, for instance within a ratio of 1:3. While this will enable a continuous control of the image scale, such a continuous control is not always required. A change in magnification may alternatively be enabled by making various lenses available for selection. A number of these lenses may be mounted on a lens-changing mechanism, such as a turret, drum or carriage. In most cases, the image of the object need not meet the particularly high quality requirements so that conventional, low-cost lenses will be sufficient.

The changes in the three-dimensional relation of the lens or the object required for a change of the image section, magnification, or object may be derived in a simple manner by conventional transmitting means, such as transmitting levers, tension cords, wheel drives, screw drives, racks and chain drives or the like from rotary knobs, control columns or push buttons actuated by the testee. Servomotors may also by used for adjusting the above-mentioned parts of the apparatus and may be electrically controlled by switches, resistors, etc., disposed near the image-bearing surface.

To enable a marking of those parts or sections of the object to be investigated in which the viewer has taken a particularly high interest, the rear side of the object is provided with or connected to a light-sensitive layer, on which the ray emitted by the light source L is incident. A movement of the object will cause the point of incidence, for instance the image of an aperture incorporated in the light source, to describe a trace which becomes visible when the light-sensitive layer is developed. The layer may be directly applied to or laid on the object or may be disposed beside, above or below the object, provided that the layer is coupled to the object to move in unison with it and the light source L is arranged so that the light bundle emitted by it falls on the layer.

Figure 5:
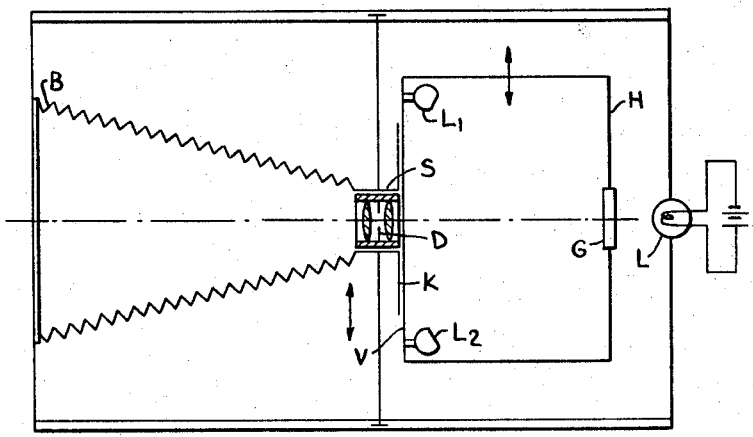
FIG. 5 is a schematic plan view, similar to FIG. 4, but embodying a further modification.

FIG. 5 shows a modified apparatus in which the position of the lens rather than of the object is changed to change the section of the object. The apparatus comprises again an image-bearing surface for receiving an image B of the object G. The lens O is again disposed in front of this image-bearing surface and is inserted in a sleeve which is mounted at the front end of a bellows serving to keep off undesired light. The front wall of the box is provided with an opening and spaced from the lens. The rear wall of the box may be hinged and this wall or an object carrier provided on this wall serves as a support for the object G, behind which a light source L is disposed which emits a bundle of light. To enable a relative movement of the article and lens, the latter is movable in directions extending parallel to the image-bearing surface. The sleeve containing the lens may be mounted, for instance, on a compound slide.

To keep off any interfering light from the side or to limit such interference to a harmless extent, a stop D may be mounted on the front end of the sleeve or a second bellows may be arranged between the lens and the front wall.

The remarks made with reference to FIG. 4 in connection with the lens are also applicable for FIG. 5. The light source L is not stationary but is coupled to the lens to move in unison with it, so that the point of incidence of the light bundle describes a trace which permits of a conclusion as to that section of the object which is selected for viewing. Such a coupling may be provided in a simple manner with the aid of a parallel motion consisting of three or four levers, which are pivoted at one end to four points of the image-bearing plane and carry at their other end a holder for the light source and are coupled to the lens or the sleeve to move in unison with it. A change in the position of the lens will result in a pivotal movement of the links about their pivots, and the light source holder will follow this movement. Such an arrangement will permit of a variation of the distance of the light source from the object. This fact is without significance in practice, if the change of this distance is kept within certain limits.

In the embodiments of FIGS. 4 and 5, the magnification selected by the testee may also be recorded with the aid of the light source. This may be effected in a very simple manner if the intensity of the emitted light bundle is variable in dependence on the adjusted magnification. This variation may be effected by means of a stop or by varying the luminous density of the light source. For the latter purpose the circuit of the light source, which consists of an electric incandescent bulb, may incorporate a series resistor which is positively increased or reduced with the mechanism for adjusting the lens. In this case the trace described by the point of incidence of the light bundle on the light-sensitive layer will consist of adjoining sections which are differently blackened after the development to permit of a conclusion as to the magnification which has been used.

It may be desirable to emphasize that portion of the trace where the testee has begun his more detailed viewing. This may also be effected by recording the point of incidence of a light bundle on a light-sensitive layer, if the intensity of the bundle decreases continuously or in steps from the beginning of the viewing or a predetermined subsequent time, for instance after one or two minutes. For this purpose, the circuit of the light source may include a resistor which is automatically connected into the circuit simultaneously or at a subsequent time and increased to a maximum value in the course of time.

Those portions of the trace which correspond to sections viewed first will then be more highly blackened. Because the blackening does not only depend on the intensity of the bundle of rays but also on the residence time of the light spot on the respective point, however, the degree of blackening will not always enable a conclusion as to the time of action of the radiation. The interest shown, however, will always be indicated because such interest may be expressed by the preference given by the testee to the various sections viewed and by the time which has been devoted to such viewing.

An illuminating device serving the purpose just explained may be provided in addition to such a device for indicating the selected magnifications. Such an arrangement will result in two records which may be disposed one adjoining the other on a single light-sensitive sheet and which may be aligned and jointly analyzed. A single illuminating device will be sufficient if the size of the illuminated spot is variable, for instance by means of a stop, in dependence on the magnification, so that the varying width of different sections of the trace will indicate the image scale which has been adopted.

Only the image directly presented to the view of the testee must be an optical reproduction. The object from which this reproduction is desired may be a picture in the usual sense of the word, for instance a printed, typed or written text, or a pictorial reproduction, or a recording, such as a video track which is converted into an image as on the screen of a television receiver by means of a usual mechanism, which is considered to be included by the term "image-producing means." In this case too, there is no basic difficulty in reproducing sections of the object and to record their selection and the magnification adopted in viewing.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a method of investigating a viewer's interest in details of an object presented, the steps comprising, exposing views at least of portions of the entire object as selected by the viewer, and recording at least approximately the periods of time spent by the viewer in retaining in exposed viewing position each of the selected successive views.

2. In a method as claimed in claim 1, and recording the selected sequence of the individual portions of the entire object viewed by the viewer.

3. In a method as claimed in claim 1, said recording comprising impinging light rays onto a photo-sensitive layer, and thereafter developing said layer, the blackening of the portions of the resulting trace corresponding to certain views indicating the time during which the individual views have been viewed.

4. In a method as claimed in claim 1, the steps comprising joining the object to be tested to a light-sensitive layer, and impinging light rays onto said photo-sensitive layer tracing thereon a path in accordance with the viewing sequence of the views, and developing the photo-sensitive layer.

5. In a method as claimed in claim 1, and during said exposing of said views at least temporarily exposing to the viewer a general view indicating the nature of the portions of the entire object.

6. In a method as claimed in claim 1, and producing images of said portions on a fixed-image-bearing plane, said images being of variable magnitude selectively adjustable with predetermined limits by the viewer, and recording the selected magnitude adjustment of the successive images along with the other recording.

7. In an apparatus for investigating a viewer's interest in details of an object presented, in combination, a support device adapted to support said object, an optical viewing device adapted to define a restricted field of view of the object on said support device, and at least portions of said devices being adapted to be moved positively by the viewer relative to each other for the optical scanning of the entire object, and recording means connected to one of said devices and being operable to record the relative movement therebetween.

8. In an apparatus for investigating a viewer's interest in details of an object presented, in combination, a support device adapted to support said object, an optical viewing device adapted to define a restricted field of view of the object on said support device, and at least portions of said devices being movable relative to each other for the optical scanning of the entire object, and recording means connected to one of said devices and being operable to record the relative movement therebetween, said object being flat and having a viewable face, said support device including a back movable in its plane and having a surface adapted to receive said face, said optical viewing system being fixed in front of said surface and adjustable to said plane and having an aperture for selectively defining the field of view at a size which corresponds at least to a predetermined section of said face, an illuminating device including a light source movable in unison with said optical viewing device, and a light-sensitive surface associated with said object and impinged by the light rays emanating from said source.

9. In an apparatus as claimed in claim 8, said light source being permanently connected to said viewing device.

10. In an apparatus for investigating a viewer's interest in details of an object presented, in combination, a support device adapted to support said object, an optical viewing device adapted to define a restricted field of view of the object on said support device, and at least portions of said devices being movable relative to each other for the optical scanning of the entire object, and recording means connected to one of said devices and being operable to record the relative movement therebetween, said object including a plurality of individual items, said viewing device being movable and including an illuminating device comprising a source of a bundle of light movable with the viewing device, said recording means comprising a plurality of photo-sensitive cells mounted on said support device and each adapted to be near an individual item, said recording means further comprising a recorder including a movable record carrier having a separate track for each photo-sensitive cell, said illuminating device cells and recorder being electrically interconnected and operable to effect automatic recording on said record carrier including an automatic change-over to the track associated with the item illuminated at a time.

11. In an apparatus for investigating a viewer's interest in details of an object presented, in combination, a support device adapted to support said object, an optical viewing device adapted to define a restricted field of view of the object on said support device, and at least portions of said devices being movable relative to each other for the optical scanning of the entire object, and recording means connected to one of said devices and being operable to record the relative movement therebetween, said viewing device comprising a structure defining a fixed-image-bearing surface, image producing means movable relative to one of said devices thereby scanning portions of the object to be viewed, the magnification of said image being adjustable, a light source disposed adjacent said support device and adapted to be located behind the object and emitting a bundle of rays producing a light spot corresponding substantially to the center of the portion to be viewed.

12. In an apparatus as claimed in claim 11, said image producing means comprising a lens system of adjustable magnification for selectively adjusting the magnitude of the image produced on said surface.

13. In an apparatus as claimed in claim 11, said image bearing surface and the axis of the bundle of rays emanating from the light source being stationary, and the support device being movable.

14. In an apparatus as claimed in claim 11, said image-bearing surface and said support device being stationary, said image producing means being movable, and the light source for producing the light spot being movable with said image producing means.

15. In an apparatus as claimed in claim 11, the luminous density of the light source being variable.

16. In an apparatus as claimed in claim 11, the luminous density of the light source being substantially constant during a predetermined period of time, and constantly decreasing subsequently.

17. In an apparatus as claimed in claim 11, the size of said light spot being variable in dependence on the magnification.

References Cited

UNITED STATES PATENTS 2,288,430   6/1942   Bauman _____ 351—7

NORTON ANSHER, *Primary Examiner.*

JOHN M. HORAN, *Examiner.*

RICHARD A. WINTERCORN, *Assistant Examiner.*